United States Patent
Sun et al.

(10) Patent No.: US 9,505,920 B2
(45) Date of Patent: Nov. 29, 2016

(54) POLYMER COMPOSITIONS FOR INJECTION STRETCH BLOW MOLDED ARTICLES

(75) Inventors: Luyi Sun, Pearland, TX (US); Tim Coffy, Houston, TX (US); Leland Daniels, Dayton, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 370 days.

(21) Appl. No.: 13/075,208

(22) Filed: Mar. 30, 2011

(65) Prior Publication Data

US 2012/0248002 A1    Oct. 4, 2012

(51) Int. Cl.

| | |
|---|---|
| B32B 1/02 | (2006.01) |
| C08L 23/10 | (2006.01) |
| B32B 1/08 | (2006.01) |
| B29C 49/06 | (2006.01) |
| B29K 23/00 | (2006.01) |
| B29L 31/00 | (2006.01) |
| C08L 23/16 | (2006.01) |

(52) U.S. Cl.
CPC ........ C08L 23/10 (2013.01); *B29B 2911/1498* (2013.01); *B29C 49/06* (2013.01); *B29K 2023/08* (2013.01); *B29K 2023/14* (2013.01); *B29K 2995/0077* (2013.01); *B29L 2031/7158* (2013.01); *C08L 23/16* (2013.01)

(58) Field of Classification Search
CPC . Y10T 428/1352; B32B 1/02; A01B 12/006; C08L 23/10; C08L 23/16; B29B 2911/1498; B29C 49/06; B29K 2023/08; B29K 2023/14; B29K 2995/0077; B29L 2031/7158
USPC ................... 428/34.1, 34.2, 35.7, 35.9, 36.9
See application file for complete search history.

(56) References Cited

U.S. PATENT DOCUMENTS

| | | | |
|---|---|---|---|
| 4,087,485 A * | 5/1978 | Huff | 525/193 |
| 4,473,687 A * | 9/1984 | Dorrer et al. | 525/240 |
| 4,595,625 A * | 6/1986 | Crass | B32B 27/32 |
| | | | 229/87.01 |
| 4,994,508 A * | 2/1991 | Shiraki et al. | 524/14 |
| 5,115,030 A * | 5/1992 | Tanaka | C08L 23/142 |
| | | | 524/528 |
| 5,514,752 A * | 5/1996 | Gutweiler et al. | 525/155 |
| 5,998,039 A * | 12/1999 | Tanizaki et al. | 428/516 |
| 6,156,856 A * | 12/2000 | Saito et al. | 526/90 |
| 6,180,719 B1 | 1/2001 | Miyata | |
| 6,657,024 B1 | 12/2003 | Blackmon et al. | |
| 7,662,892 B2 * | 2/2010 | Jiang et al. | 526/65 |
| 2002/0037965 A1* | 3/2002 | Kinoshita et al. | 525/127 |
| 2002/0086954 A1* | 7/2002 | Lewtas | C08F 4/14 |
| | | | 526/69 |
| 2004/0092631 A1* | 5/2004 | Joseph | 524/230 |
| 2005/0113517 A1* | 5/2005 | Tayano et al. | 525/191 |
| 2006/0293460 A1* | 12/2006 | Jacob | C08L 23/16 |
| | | | 525/240 |
| 2009/0031522 A1 | 2/2009 | Yoo et al. | |
| 2009/0315226 A1 | 12/2009 | Sun | |
| 2010/0024349 A1 | 2/2010 | Pope | |
| 2010/0031682 A1 | 2/2010 | Gaerlan | |
| 2010/0243498 A1 | 9/2010 | Sun et al. | |
| 2010/0316820 A1 | 12/2010 | Kolb | |

FOREIGN PATENT DOCUMENTS

JP         2007137968 A  *  6/2007

* cited by examiner

*Primary Examiner* — Marc A Patterson
(74) *Attorney, Agent, or Firm* — Albert Shung

(57) ABSTRACT

A polymer composition of polypropylene copolymer and 1 to 50% by weight of hard resin. The polypropylene copolymer is either an impact copolymer or a random copolymer. The polymer composition can be used to make injection stretch blow molded articles having improved top load strength.

20 Claims, 3 Drawing Sheets

POLYMER COMPOSITIONS FOR INJECTION STRETCH BLOW MOLDED ARTICLES

FIELD

The present invention generally relates to polymer compositions. More specifically the present invention relates to polypropylene based polymer compositions for injection stretch blow molding (ISBM) of articles, and methods of making and using same.

BACKGROUND

Injection stretch blow molding (ISBM) is a process for producing hollow plastic forms, such as bottles and dairy and juice containers. Manufacturers continue to search for alternative polymers and methods of preparing these products.

Various polymer compositions of polypropylene can be used to produce ISBM articles. Depending on the polymer compositions, these articles can vary greatly in both mechanical and optical properties, such as top load strength, drop impact strength, haze, and opacity, as well as processability.

It is desirable to improve mechanical, optical, and processability properties of polymer compositions used to make commercial products. It is toward this end that the present invention is directed, particularly in the production of ISBM articles.

SUMMARY

The present invention, in its embodiments, concerns a polymer composition that includes a polypropylene copolymer component and a hard resin component. Generally, the polymer composition includes a polypropylene copolymer and 1 to 50% by weight of a hard resin. The polymer composition can be useful for injection stretch blow molding applications.

In one embodiment, either by itself or in combination with other embodiments, the present invention is a polymer composition that includes a polypropylene impact copolymer and a hard resin. The polypropylene impact copolymer can include at least 60% by weight of a polypropylene homopolymer and less than 40% by weight of a propylene-ethylene rubber. The polypropylene impact copolymer can have a melt flow rate of from 1 to 500 g/10 min. The addition of hard resin can cause an injection stretch blow molded bottle to have at least 20% better top load strength, as compared to neat impact copolymer. The injection stretch blow molded bottle made from the composition can have a normalized top load strength calculated by the top load strength divided by bottle weight of at least 5.5 N/g.

In one embodiment, either by itself or in combination with other embodiments, the present invention is a polymer composition that includes a polypropylene random copolymer and a hard resin. The polypropylene random copolymer can have less than 10% by weight of ethylene comonomer. An injection stretch blow molded bottle made from the composition can have a normalized top load strength calculated by the top load strength divided by bottle weight of at least 6.5 N/g.

In one embodiment, either by itself or in combination with other embodiments, the present invention is a method for making a polymer composition that includes providing a polypropylene copolymer, mechanically blending the polypropylene copolymer with 1 to 50% by weight of a hard resin, and extruding the polypropylene copolymer and the hard resin to form a substantially homogenous polymer blend, where the polymer blend consists essentially of the polypropylene copolymer and the hard resin. Embodiments of the polypropylene copolymer can be either an impact copolymer or a random copolymer or combinations thereof.

In one embodiment, either by itself or in combination with other embodiments, the present invention is an injection stretch blow molded article made from a polymer composition that includes a polypropylene impact copolymer and 1 to 50% by weight of a hard resin. The article can have a top load strength of from 130 to 160 N, an 80 to 100% pass rate for a drop impact test (from 6 feet at 40° F.), and optical properties of haze from 60 to 80% and gloss (45°) from 5 to 15.

In one embodiment, either by itself or in combination with other embodiments, the present invention is a method of making an injection stretch blow molded article by providing a polymer composition that includes a polypropylene impact copolymer and 5 to 50% by weight of hard resin, injection molding the polymer composition into a preform and then stretch-blowing the preform into an article. The article can be used in low temperature applications, such as at or below 40° F. The article can be either opaque or semi-opaque.

The various aspects of the present invention can be joined in combination with other embodiments of the invention and the listed embodiments herein are not meant to limit the invention. All combinations of embodiments of the invention are enabled, even if not given in a particular example herein.

DETAILED DESCRIPTION

Figure 1:
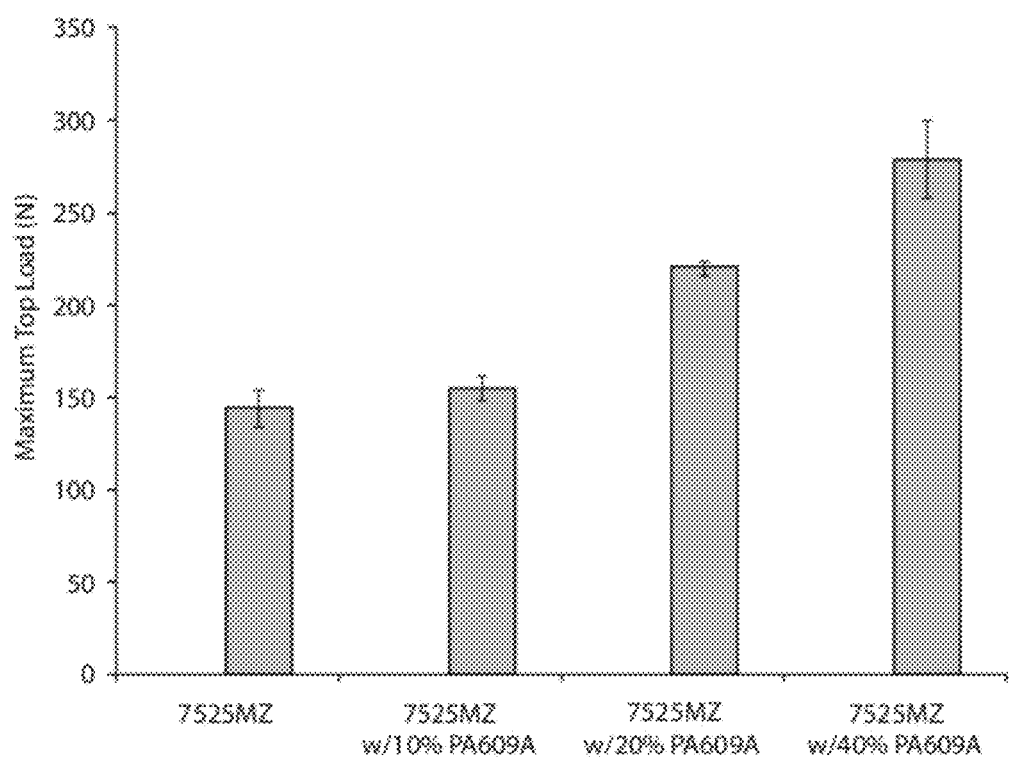
FIG. 1 is a chart showing the top load strength in N for bottles made from polymer compositions of polypropylene random copolymer and hard resin.

The present invention is for a polymer composition that includes a polypropylene copolymer and hard resin. The polypropylene copolymer can be an impact copolymer (ICP) or a random copolymer (RCP), or combinations thereof.

In one embodiment, the polypropylene copolymer is an impact copolymer (or ICP). Impact copolymers may also be referred to as heterophasic copolymers. An impact copolymer generally includes a rubbery phase of comonomer dispersed within a matrix phase. The matrix is a generally hard plastic, which alone can suffer poor impact absorption at low temperatures. The rubbery phase can decrease the hardness of the polymer composition while increasing impact absorption. In some cases, the inclusion of a rubbery phase can also decrease optical clarity and increase haze. However, certain articles used at low temperatures are also articles which are either not affected by or are benefited by increased opacity. Dairy products, for instance, store better in containers of higher opacity with reduced light penetration.

The matrix phase of the impact copolymer can include a polypropylene polymer, for instance, a polypropylene homopolymer. The homopolymer may contain up to about 5 wt % of another alpha-olefin, including but not limited to, $C_2$ and $C_4$ through $C_8$ alpha-olefins, such as 1-butene and ethylene. Despite the potential presence of small amounts of other alpha-olefins, this polymer is generally referred to as a polypropylene homopolymer.

The rubbery phase of the impact copolymer includes comonomers selected from the group consisting of $C_2$ to $C_{20}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof. In one embodiment, the comonomer is ethylene. These comonomers can be used in combinations including lower and higher MW olefin components. Examples include propylene/butene, hexene or octene copolymers, and ethylene/butene, hexene or octene copolymers, and propylene/ethylene/hexene-1 terpolymers. Ethylene-propylene diene terpolymers and related elastomeric ethylene propylene copolymers may also be used. In an embodiment, the rubbery phase includes a block copolymer of propylene and ethylene, with propylene as the major constituent and about 5 to 25 wt % by weight ethylene. In this embodiment, the copolymer phase can be referred to as an ethylene/propylene rubber. Small amounts of other polymerizable monomers may be included with the propylene and ethylene if desired.

The matrix phase of the impact copolymer, typically a polypropylene homopolymer, can include at least 40 wt %, optionally at least 50 wt %, or optionally at least 60 wt % by weight of the impact copolymer. In an embodiment, the matrix includes about 70 to 85 wt % by weight of the impact copolymer. The rubbery phase can include about 7 to 22 wt %, optionally about 10 to 18 wt % by weight of the impact copolymer. The overall comonomer content, typically ethylene, of the total ICP can be from about 1 to 30 wt %, optionally from about 3 to 15 wt %, or optionally from about 5 to 10 wt % by weight of the total impact copolymer.

In an embodiment, the ICP polypropylene may be selected from the group of commercially available ICP polypropylenes. In another embodiment, the ICP polypropylene is selected from the group sold under the product reference numbers 4280, 4320, 4520, 4720, 5571, 5720 and 5724 and combinations thereof, all of which are commercially available from Total Petrochemicals, Inc. Methods of making ICPs are well known in the art, for instance, in one non-limiting embodiment methods and techniques are described in U.S. Pat. No. 6,657,024, incorporated herein by reference, may be used. Polypropylene ICPs have been found useful in certain ISBM applications (see Patent Application No. 2009/0315226 to Fina, which is herein incorporated by reference).

The ICP may be one having a density range from 0.88 to 0.93 g/cm$^3$, optionally from 0.89 to 0.92 g/cm$^3$, and, optionally from 0.9 to 0.91 g/cm$^3$, as determined in accordance with ASTM D-1505. In an embodiment, the ICP may have a polydispersity from 4 to 12, optionally from 5 to 10. In an embodiment, the ICP may have xylene solubles of 25% or less. In another embodiment, the xylene solubles may range from 1 to 25 wt %, optionally 5 to 15 wt %. In an embodiment, the ICP may have a melting point ranging from 155 to 170° C., optionally from 158 to 166° C., optionally from 160 to 165° C. And in still another non-limiting embodiment the ethylene content of the ICP may range from 7 to 15 wt %, and optionally from 9 to 14 wt %.

The ICP polypropylene may have a melt flow rate (MFR) ranging from 0.1 to 500 g/10 min, optionally from 1 to 250 g/10 min, optionally 1 to 100 g/10 min, optionally 1 to 50 g/10 min, optionally from 1.0 to 20 g/10 min, as determined in accordance with ASTM D-1238 condition "L." The ICP can have a weight average molecular weight Mw ranging from 280,000 to 840,000, optionally ranging from 320,000 to 780,000, and optionally ranging from 420,000 to 700,000.

The impact copolymer can be made using any catalyst known in the art for preparing an impact copolymer. Catalysts that can be used include, but are not limited to, metallocene catalyst systems, single site catalyst systems, Ziegler-Natta catalyst systems or combinations thereof. The catalysts may be activated for subsequent polymerization and may or may not be associated with a support material. The homopolymer matrix and the rubbery copolymer phase can be combined as a physical blend or an in-situ blend. In an in-situ blend, the rubber phase is incorporated into the homopolymer matrix by co-polymerization. The co-polymerization process may include at least two stages, wherein the homopolymer is produced in a first reaction zone, the product of which is transferred to a second reaction zone for contact with a comonomer and additional monomer (e.g, propylene) to produce a rubber component of the heterophasic copolymer. In an embodiment, the rubbery copolymer can be prepared using a controlled morphology catalyst that produces ethylene-propylene copolymer spherical domains dispersed in a semi-crystalline polypropylene matrix. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example.

Various other additives may be present in the impact copolymer, such as, for example, nucleating agents, clarifying agents, stabilization agents, antioxidants, anti-static agents, lubricants, filler materials, slip agents, acid neutralizers, and the like, or some combination thereof. In an embodiment the additives are present in a quantity from 0.01 to 5 wt %, optionally from 0.1 to 3 wt %, optionally from 0.5 to 2 wt %, in relation to the weight of the impact copolymer.

In one embodiment, the polypropylene copolymer is a random copolymer (or RCP). The random copolymer generally includes a single propylene phase with a comonomer. The comonomer can be selected from $C_2$ to $C_{20}$ olefins. For example, the comonomer may be selected from ethylene, propylene, 1-butene, 1-pentene, 1-hexene, 1-heptene, 1-octene, 1-nonene, 1-decene, 4-methyl-1-pentene and combinations thereof. In one embodiment, the random copolymer is a homopolymer of ethylene and propylene, with propylene in the higher proportion. Propylene generally includes at least 89 wt % of the random copolymer, while the olefin comonomer ranges from about 0.15 to 11 wt %, optionally from about 1 to 5 wt %, or optionally from about 2 to 4 wt % based on the total weight of the random copolymer. In an embodiment, the polypropylene is a random ethylene-propylene ($C_2/C_3$) copolymer and may range from 0.1 wt % to 10 wt % ethylene, optionally from 2 wt % to 7 wt % ethylene, optionally from 2 wt % to 6 wt % ethylene.

The random copolymer can be made using any catalyst known in the art for making polypropylene polymer, such as metallocene catalyst systems, single site catalyst systems, Ziegler-Natta catalyst systems or combinations thereof. In an embodiment, the olefin comonomer is randomly inserted between the propylene groups; in one arrangement, there are no consecutive sequences of such alpha olefin groups.

The RCP can have a melt flow rate from 0.5 to 500 g/10 min, optionally from 0.5 to 250 g/10 min, optionally from 0.5 to 100 g/10 min, optionally from 1.0 to 50 g/10 min, optionally from 1.0 to 20 g/10 min, as determined in accordance with ASTM D-1238 condition "L." In an embodiment, the RCP may have a density of from 0.890 g/cc to 0.920 g/cc, optionally from 0.895 g/cc to 0.915 g/cc, and optionally from 0.900 g/cc to 0.910 g/cc as determined in accordance with ASTM D-1505. The RCP can have a molecular weight distribution from 2.5 to 20, optionally from 2.0 to 10, optionally from 3.0 to 8. The xylene soluble fraction of the random copolymer can be less than 10 wt %, or optionally between 5 and 8 wt %. The RCP may have a melting point temperature of from 100° C. to 165° C., optionally from 110° C. to 155° C., optionally from 128° C. to 148° C.

The random copolymer may contain additives such as antioxidants, light stabilizers, acid scavengers, lubricants, antistatic additives, nucleating/clarifying agents, colorants, or combinations thereof. In an embodiment the additives are present in a quantity from 0.01 to 5 wt %, optionally from 0.1 to 3 wt %, optionally from 0.5 to 2 wt %, in relation to the weight of the random copolymer.

According to the present invention, the polypropylene copolymer, which is either an impact copolymer or a random copolymer, is combined with a hard resin to form a polymer composition. The hard resin generally provides increased hardness to the polymer composition.

The polymer composition contains a hard resin in a quantity from 1 to 50 wt %, optionally from 5 to 40 wt %, optionally from 10 to 30 wt %, in relation to the weight of the polymer composition. The hard resin can be chosen from the group consisting of hydrocarbon resins, ketone resins, polyamide resins, colophonium, coumarone resins, terpene resins, or chlorinated aliphatic or aromatic hydrocarbon resins, or combinations thereof.

The softening point of the hard resin as measured according ASTM E-28 is generally from 60° C. to 180° C., optionally from 80° C. to 150° C., optionally from 100° C. to 140° C., optionally from 120° C. to 140° C. In general, the hydrocarbon resins have a number molecular weight Mn between 500 and 2500 (Mw 500 to 3000) and therefore differ from long-chain high molecular weight polymers, whose Mw (weight mean) is generally in the magnitude of 10,000 to multiples of 100,000. In a non-limiting embodiment the hard resin can have a melt flow rate (MFR) of from 1 to 50 g/10 min at 230° C., 2.16 Kg. Optionally the MFR can range from 10 to 40 g/10 min, optionally from 20 to 30 g/10 min.

In an embodiment the hydrocarbon resins are hydrogenated petroleum resins. These are usually prepared by catalytically hydrogenating a thermally polymerized steam cracked petroleum distillate fraction, especially a fraction having a boiling point of between 20° C. and 280° C. These fractions usually are of compounds having one or more unsaturated cyclic rings in the molecule, such as cyclodienes, cycloalkenes and indenes. It is also possible to hydrogenate resins produced by the catalytic polymerization of unsaturated hydrocarbons.

The petroleum resins are those hydrocarbon resins that are manufactured through polymerization of petroleum materials in the presence of a catalyst. These petroleum materials typically contain a mixture of resin-producing substances such as styrene, methylstyrene, vinyl toluene, indene, methyl indene, butadiene, isoprene, piperylene, and pentylene. The styrene resins are homopolymers of styrene or copolymers of styrene with other monomers such as methylstyrene, vinyl toluene, and butadiene. The cyclopentadiene resins are cyclopentadiene homopolymers or cyclopentadiene copolymers, which can be obtained from coal tar distillates and decomposed petroleum gas. These resins can be manufactured by keeping the materials that contain cyclopentadiene at high temperature for a long time. Dimers, trimers, or oligomers may be obtained as a function of the reaction temperature.

The terpene resins are polymers of terpenes, i.e., hydrocarbons of the formula $C_{10}H_{16}$, which are contained in almost all ethereal oils or oily resins of plants, and phenol-modified terpene resins. Pinene, α-pinene, dipentene, limonene, myrcene, camphene, and similar terpenes are examples of terpenes. The hydrocarbon resins may also be modified hydrocarbon resins. The modification is generally performed through reaction of the raw materials before polymerization, by introducing special monomers, or through reaction of the polymerized product, hydrogenation or partial hydrogenation particularly being performed.

The hard resin can be from 1 to 50 wt %, optionally 5 to 40 wt %, optionally 5 to 30 wt %, of the polymer composition. The hard resin may be incorporated into the polymer composition by various ways. It can be provided as a final pellet, where the polypropylene and hard resin have been extruded together to form an intimate melt blend, then pelletized. It can be provided as a pellet masterbatch, which is co-blended with neat polypropylene pellets at a preform injection molder. It can also be provided in a natural form, where neat polypropylene and neat hard resin are mixed at a preform injection molder. Generally it is desired to have an intimate melt blend that has been cooled and pelletized to obtain enhanced consistency of the final product.

The polymer composition can be used in various applications including, but not limited to, by injection molding, rotomolding, blow molding or extrusion such as cast or oriented film, sheet or profile, and thermoforming. In one embodiment, the application of the polymer composition is injection stretch blow molding (ISBM).

The polymer composition can be used to make various articles including, but not limited to, food containers, health care products, durable household and office goods, squeeze bottles, clear flexible film and sheet, automotive interior trim and fascia, wire, cable, pipe, and toys. In one embodiment, the polymer composition can be used to make articles used in low temperature packaging applications, such as lids or containers, including low temperature storage containers.

In one embodiment, the present invention is a polymer composition having a polypropylene impact copolymer component and 1 to 50 wt % of a hard resin component. The composition can have top load strength from about 130 to 160 N, can have at least a 90% pass rate for a drop impact test (from 6 feet at 40° F.), haze from about 60 to 80%, and gloss (45°) from about 5 to 15. A normalized top load strength calculated by the top load strength divided by bottle weight can range from about 5.0 to 10.0 N/g. In an embodiment the normalized top load strength is at least 5.3 N/g, optionally at least 5.5 N/g, optionally at least 6.0 N/g.

In one embodiment, the present invention is a polymer composition of a polypropylene random copolymer and from 1 to 50% by weight hard resin. The composition can have top load strength from about 200 to 350 N, a 0 to 50% pass rate for a drop impact test (from 6 feet at 40° F.), haze from about 1 to 5%, and gloss (45°) from about 60 to 90. A normalized top load strength calculated by the top load strength divided by bottle weight can range from about 6.5 to 15.0 N/g. In an embodiment the normalized top load strength is at least 7.0 N/g, optionally at least 8.0 N/g, optionally at least 9.0 N/g.

In one embodiment, the present invention is a method for making a polymer composition, including the steps of polymerizing a polypropylene copolymer and combining the resultant product with a hard resin to get a product having 1 to 50 wt % hard resin, where the polypropylene copolymer is either a random copolymer or and impact copolymer.

In one embodiment, the present invention is a method for making an injection stretch blow molded article, using a polymer composition that includes a polypropylene copolymer and 1 to 50 wt % of a hard resin, where the polypropylene copolymer is either a random copolymer or an impact copolymer, or a combination thereof.

In one embodiment, the present invention is an ISBM article having a polymer composition of a polypropylene copolymer and 1 to 50 wt % of a hard resin, where the polypropylene copolymer is either a random copolymer or an impact copolymer, or a combination thereof. In an embodiment, the ISBM article is used in low temperature applications. In an embodiment, the ISBM article is an opaque container that shields light from the contents of the container.

In an embodiment the addition of the hard resin improves the barrier properties of a polymer composition as compared to a polymer composition made from a substantially similar polymer composition without the hard resin. In an embodiment the water vapor transmission rate (WVTR) is reduced by the addition of the hard resin. In an embodiment the WVTR is reduced by at least 10%, optionally by at least 5%, with the addition of the hard resin. In an embodiment the oxygen transmission rate ($O_2$TR) is reduced by the addition of the hard resin. In an embodiment the $O_2$TR is reduced by at least 10%, optionally by at least 5%, with the addition of the hard resin.

The following examples are meant to be merely illustrative of particular embodiments of the present invention, and are by no means limiting of the scope of the invention.

EXAMPLE 1

A polymer composition including a polypropylene impact copolymer and a hard resin was prepared and tested for top load strength, drop impact strength, gloss, and haze. The polymer composition contained a commercial polypropylene impact copolymer (ICP), sold by Total Petrochemicals as 5946WZ, and a commercial hard resin masterbatch (50/50 blend of hard resin and PP), PA609A, from Exxon Mobil that is a hydrogenated polyterpene having a MFR ranging from 10 to 30 g/10 min at 230° C., 2.16 Kg. The hard resin masterbatch was 20% by weight of the composition.

The ICP and hard resin were dry blended and subsequently injection molded into 23 g preforms on a Netsal injection molder under the following injection molding conditions: 23 g preform weight, F finish, 250° C. barrel temperature, 250° C. hot runner temperature, 50/50° F. mold temperature (static/move), 5 mm/s injection speed, 15 sec cooling time, 4 sec hold time, and a 29 second cycle time. The preforms were conditioned at room temperature for at least 24 hours before they were stretch-blow-molded into 500 mL bottles on an ADS G62 linear injection stretch blow molder. Neat ICP preforms were also molded under similar conditions and stretch-blow-molded into bottles for comparison of mechanical and optical properties. Table 1 shows the comparative properties.

TABLE 1

Properties of bottles prepared from ICP and ICP/20% Hard Resin.

|  | ICP | ICP + 20 wt % Hard Resin |
|---|---|---|
| Top load (N) | 118 | 146 |
| Gloss, 45° | 10.9 | 10.1 |
| Haze (%) | 76.5 | 75.8 |
| Drop impact, 6 feet @ 40° F. | Vertical: 12 of 12 pass Horizontal: 12 of 12 pass | Vertical: 12 of 12 pass Horizontal: 12 of 12 pass |

As shown in Table 1, with an incorporation of 20% hard resin, the bottle top load strength was improved by about 24%, while the drop impact strength remained high enough to pass the typical industrial standard for low temperature packaging applications. A normalized top load strength calculated by the top load strength divided by bottle weight improved from about 5.1 N/g to greater than 6.0 N/g. Optical properties were virtually unaltered by the addition of the hard resin.

EXAMPLE 2

Polymer compositions of polypropylene random copolymer and varying amounts of hard resin were prepared and tested for top load strength, drop impact strength, gloss and haze. The polymer compositions contained a commercial polypropylene random copolymer (RCP), sold by Total Petrochemicals as 7525MZ, and a commercial hard resin masterbatch (50/50 blend of hard resin and PP), PA609A, from Exxon Mobil. Four compositions were prepared, containing 0, 10, 20, and 40% by weight PA609A of the total polymer composition.

The RCP and hard resin masterbatch were dry blended and subsequently injection molded into 23 g preforms on a Netsal injection molder under the following injection molding conditions: 23 g preform weight, F finish, 250° C. barrel temperature, 250° C. hot runner temperature, 50/50° F. mold temperature (static/move), 5 mm/s injection speed, 15 sec cooling time, 4 sec hold time, and a 29 second cycle time. The preforms were conditioned at room temperature for at least 24 hours before they were stretch-blow-molded into bottles on an ADS G62 linear injection stretch blow molder. Neat RCP preforms were also molded under similar conditions and stretch-blow-molded into bottles for comparison. Generally, the addition of a hard resin had little effect on the preform injection molding process.

The neat RCP and the blend preforms were successfully blow molded into 500 mL bottles. A 100% good bottle rate was achieved at both 2000 and 3000 b/h, the molded bottles exhibiting uniform appearance and high clarity. The bottles were subsequently tested for top load, drop impact, haze, and gloss.

The top load strength test showed that the incorporation of hard resin could effectively improve the stiffness of the molded bottles. Table 2 and FIG. 1 show the top load strength in N for bottles made from the four polymer compositions. The addition of 20% and 40% of PA609A improved top load strength by about 52% and 94%, respectively. A normalized top load strength calculated by the top load strength divided by bottle weight was 6.3 N/g for the composition with no hard resin added. The addition of 10% PA609A resulted in an increase in normalized top load strength to 6.8 N/g. The addition of 20% PA609A resulted in an increase to 9.5 N/g. The addition of 40% PA609A resulted in an increase in normalized top load strength to 12.0 N/g.

Drop impact test results showed that the addition of hard resin decreased the impact strength of the molded bottles, as shown in Table 2.

TABLE 2

Drop Impact Strength of Polypropylene Random Copolymer/Hard Resin Compositions.

|  | RCP | RCP + 10% PA609A | RCP + 20% PA609A | RCP + 40% PA609A |
|---|---|---|---|---|
| Top load (N) | 145 | 156 | 219 | 275 |
| Gloss, 45° | 82 | 68 | 76 | 75 |
| Haze (%) | 1.1 | 1.7 | 2.6 | 1.8 |
| Drop Impact 4 feet @ 40° F. | | | | |
| Vertical | 3 of 12 fail | 12 of 12 fail | 12 of 12 fail | 12 of 12 fail |
| Horizontal | 0 of 12 fail | 0 of 12 fail | 12 of 12 fail | 12 of 12 fail |

The bottles became more brittle with the addition of the hard resin. When the concentration of hard resin was above 20%, the bottles were so brittle that they shattered during the drop impact testing. Thus, the polymer compositions of polypropylene random copolymer and hard resin can be used most effectively in the fields where drop impact performance is not critical.

Figure 2:
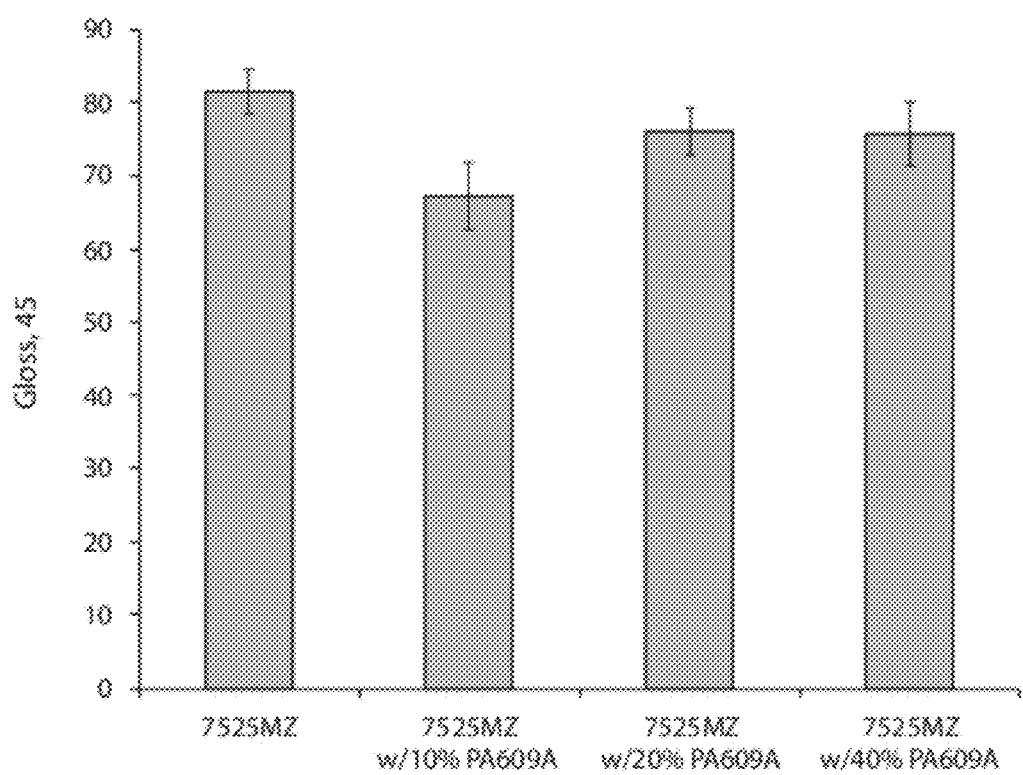
FIG. 2 is a chart showing gloss (45°) for bottles made from polymer compositions of polypropylene random copolymer and hard resin.
Figure 3:
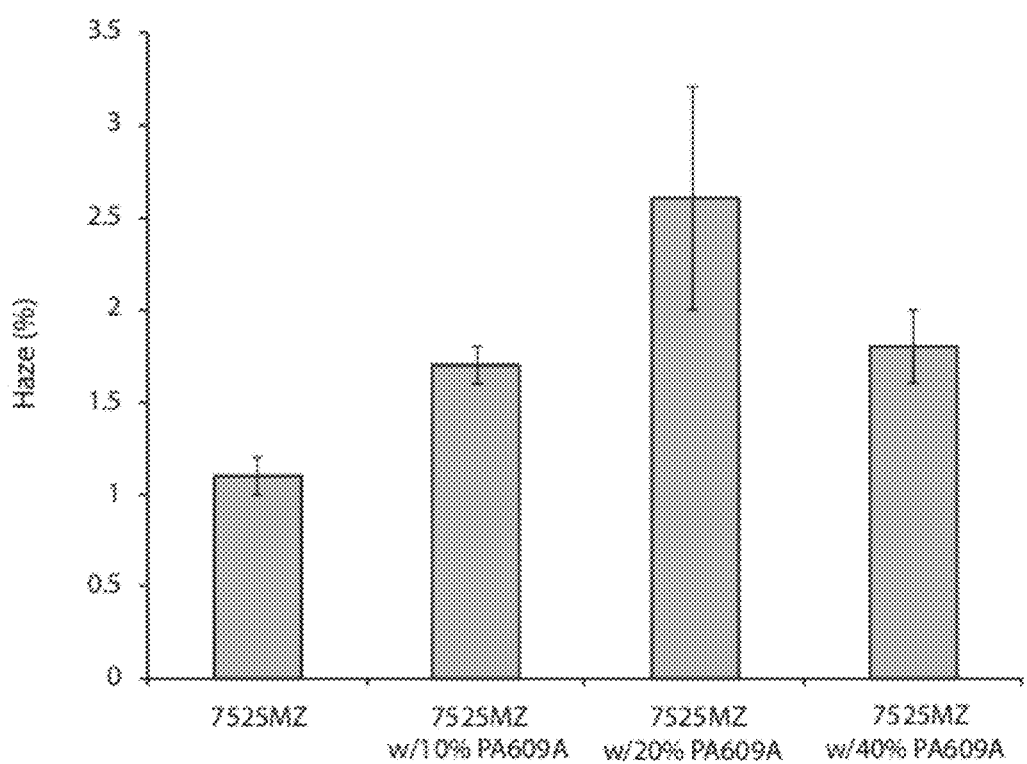
FIG. 3 is a chart showing haze (%) for bottles made from polymer compositions of polypropylene random copolymer and hard resin.

The incorporation of hard resin only led to slight changes in bottle optical properties. FIG. 2 is a chart showing gloss (45°) for bottles made from the four polymer compositions. FIG. 3 is a chart showing haze (%) for bottles made from the four polymer compositions. These charts show that addition of hard resin decreases gloss slightly and increases haze slightly, but the values are not significantly different from neat RCP bottles.

Drop impact strength provides information about the strength of an ISBM end-use article when dropped from a height. Tests of the drop impact strength may be carried out by dropping a set number of filled and capped bottles (e.g., 12) vertically onto the bottle base and horizontally onto the bottle side. The weight and the volume of the bottles may include any suitable weight and volume. In an embodiment, the bottle has a weight of 23 g and a volume of 500 mL.

Testing of the drop impact strength may include dropping bottles, which have been stored at 40° F. or at room temperature for at least 12 hours from 4 or 6 feet (ft). A material is considered to have passed the drop impact strength test if all articles in the set (i.e., 12) were still intact after initial impact and there was zero failure. The failure criteria may include: a) any breakage of any location (including cracked base, broken finish), zero is acceptable; b) delamination of any size and location; c) denting of any size and location. Typically, the experiment may be repeated if the lid on the bottle, instead of the bottle itself, failed.

Top load strength and bumper compression strength provide information about the crushing properties of an ISBM end-use article when employed under crush test conditions. Tests of the top load and bumper compression strength may be carried out by placing the ISBM article on a lower plate (vertically for top load strength and horizontally for bumper compression) and slowly raising it against an upper plate to measure the corresponding load capacity of the ISBM articles (maximum value for top load strength and the value at ½ inch deflection for bumper compression strength).

As used herein, "cold temperature" refers to a range of temperatures typical of standard refrigeration methods and means that a temperature difference of a few degrees does not matter to the phenomenon under investigation, such as drop impact testing. In some environments, cold temperature may include a temperature of from about 0° C. to about 10° C. (32° F. to 50° F.), while in other environments, cold temperature may include a temperature of from about 2° C. to about 8° C. (35.6° F. to 46.4° F.), for example. For purposes of cold temperature drop impact testing, as discussed herein, it is customary in the industry to test at a temperature of about 4° C. (39.2° F.). However, cold temperature measurements generally do not include close monitoring of the temperature of the process and therefore such a recitation does not intend to bind the embodiments described herein to any predetermined temperature range.

As used herein, "opaque" means an article is impenetrable to visible light, that is, an opaque object prevents transmission of essentially all visible light. "Transparent" means essentially all visible light passes through the article. The term "semi-opaque" means some, but not all, visible light passes through the article.

As used herein, the term "polymer composition" refers to a blend of two or more polymers, and is interchangeable with the term "polymer blend". In the present invention, the polymer compositions are blends of a hard resin and another polypropylene polymer.

The term "impact copolymer" refers to a polymer containing a matrix phase that provides stiffness and a dispersed rubbery phase that provides toughness and impact absorption.

The term "random copolymer" refers to a polymer containing a comonomer that is randomly distributed.

It is to be understood that while illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the invention may be devised without departing from the basic scope thereof and the scope thereof is determined by the claims that follow.

What is claimed is:

1. An injection stretch blow molded (ISBM) article comprising:
a polymeric composition comprising a polypropylene impact copolymer including a matrix phase and a rubbery phase dispersed within the matrix phase; and, from 1 to 50 weight percent of a hard resin, wherein the hard resin has a softening point, as measured according ASTM E-28, of from 60° C. to 180° C. and a melt flow rate (MFR) of from 1 to 50 g/10 min at 230° C. and a load of 2.16 kg, and wherein the ISBM article exhibits a top load strength of from 103 to 160 N, a normalized top load strength of from 5.0 to 10.0 N/g, a haze of from 60 to 80%, and a gloss at 45° of from 5 to 15, and wherein the ISBM article is opaque or semi-opaque.

2. The article of claim 1, wherein the hard resin is present in the polymer composition in an amount ranging from 5 to 50 weight percent.

3. The article of claim 1, wherein the softening point of the hard resin, as measured according ASTM E-28, is from 80° C. to 150° C.

4. The article of claim 1, wherein the softening point of the hard resin, as measured according ASTM E-28, is from 100° C. to 140° C.

5. The article of claim 1, wherein the softening point of the hard resin, as measured according ASTM E-28, is from 120° C. to 140° C.

6. The article of claim 1, wherein the hard resin has a number average molecular weight (Mn) of between 500 and 2500.

7. The article of claim 1, wherein the hard resin has a weight average molecular weight (Mw) of between 500 and 3000.

8. The article of claim 1, wherein the hard resin has a melt flow rate (MFR) of from 10 to 40 g/10 min at 230° C. and a load of 2.16 kg.

9. The article of claim 1, wherein the hard resin has a melt flow rate (MFR) of from 20 to 30 g/10 min at 230° C. and a load of 2.16 kg.

10. The article of claim 1, wherein the hard resin comprises a hydrocarbon resin.

11. The article of claim 10, wherein the hydrocarbon resin is a hydrogenated petroleum resin.

12. The article of claim 1, wherein the hard resin comprises a ketone resin.

13. The article of claim 1, wherein the hard resin comprises a polyamide resin.

14. The article of claim 1, wherein the hard resin comprises colophonium.

15. The article of claim 1, wherein the hard resin comprises a coumarone resin.

16. The article of claim 1, wherein the hard resin comprises a terpene resin.

17. The article of claim 1, wherein the hard resin comprises a chlorinated aliphatic hydrocarbon resin.

18. The article of claim 1, wherein the hard resin comprises a chlorinated aromatic hydrocarbon rein.

19. The article of claim 1, wherein polypropylene impact copolymer has a density of from 0.88 to 0.93 g/cm$^3$ as determined in accordance with ASTM D-1505, a polydispersity of from 4 to 12, a xylene solubles of 25% or less, a melting point of from 155 to 170° C., an melt flow rate of from 0.1 to 500 g/10 min. as determined in accordance with ASTM D-1238 condition L, and a weight average molecular weight (Mw) of form 280,000 to 840,000.

20. The article of claim 1, wherein the hard resin in present in the polymer composition in an amount ranging from 5 to 50 weight percent, and wherein the hard resin comprises a hydrocarbon resin, a ketone resin, a polyamide resin, colophonium, a coumarone resin, a terpene resin, a chlorinated aliphatic hydrocarbon resin, a chlorinated aromatic hydrocarbon rein, or combinations thereof.

* * * * *